United States Patent [19]

Yazaki

[11] Patent Number: 5,418,836
[45] Date of Patent: May 23, 1995

[54] RADIOTELEPHONE EQUIPMENT FOR USE IN VEHICLE

[75] Inventor: Tomiyuki Yazaki, Tochigi, Japan

[73] Assignee: Kabushiki Kaisha Honda Access, Saitama, Japan

[21] Appl. No.: 59,654

[22] Filed: May 12, 1993

[51] Int. Cl.⁶ .................. H04M 11/00; H04M 1/00
[52] U.S. Cl. ........................... 379/58; 379/428; 379/437
[58] Field of Search ............ 379/55, 61, 428, 429, 379/437; 455/89, 90, 345, 346, 351

[56] References Cited

U.S. PATENT DOCUMENTS

| | | | |
|---|---|---|---|
| 3,550,001 | 12/1970 | Hanley | 455/345 |
| 4,090,134 | 5/1978 | Arai | 455/90 |
| 4,455,454 | 6/1984 | Umebayashi | 379/63 |
| 4,896,370 | 1/1990 | Kasparian et al. | 455/89 |
| 5,265,158 | 11/1993 | Tattari | 455/90 |

Primary Examiner—James L. Dwyer
Assistant Examiner—Jack Chiang

[57] ABSTRACT

A radiotelephone equipment for use in a vehicle is constructed in such a way that a telephone function unit and a transceiver are incorporated together in a case as a unitary member and the case is designed to have the same external form and size as those of a fitting recess for audio equipment which is provided on the center console serving as a supporting section within a compartment of the vehicle. The fitting recess is designed to have the same required standard size as that determined for the external form of the audio equipment, whereby the vehicular radiotelephone equipment and the audio equipment can be fitted together in the compartment of the vehicle to enhance the unity therein.

1 Claim, 8 Drawing Sheets

RADIOTELEPHONE EQUIPMENT FOR USE IN VEHICLE

BACKGROUND OF THE INVENTION

1. Field of the Invention

This invention relates to radiotelephone equipment mounted for use in a vehicle such as an automobile.

2. Description of the Prior Art

It is known in general that an audio equipment is fitted in a recess made in a center console within a compartment of the vehicle. Normally, the audio equipment is generally standardized in size, the recess in the center console is also designed to have the required standard size in response thereto. In addition, it is also well-known in the art of radiotelephone equipment for use in a vehicle that there is provided a handset constituting a part of the telephone function part on an armrest portion at a side of an assistant driver's seat and through which a cord is connected to a transceiver mounted in a trunk.

Furthermore, there is also known a portable radiotelephone which is adapted to be carried by detachably incorporating a small-sized transmitter-receiver with a small-sized transceiver.

By the way, if the handset of the vehicular radiotelephone equipment and the detachable transceiver can be formed as a unitary member, there will be no trouble relating to a plurality of components which must be secured at plural points respectively and each of the components must be connected by a long cable as seen in the prior art and it will make the installation easier.

In addition, if such a unitary member can be fitted in the center console in the same manner as the audio equipment, it will be useful to improve the operability of a key or the like. It will be more preferable if the components can be used in common for both the portable radiotelephone and the vehicular radiotelephone equipment.

SUMMARY OF THE INVENTION

It is therefore an object of the present invention to provide an improved radiotelephone equipment for use in a vehicle which can meet such demands as described above.

To accomplish the above object, there is provided, according to the present invention, radiotelephone equipment for use in a vehicle comprising: a telephone function unit including a transmitter-receiver section, an operating section and a communication control section; a transceiver connected to the telephone function unit; a case used in common to incorporate the telephone function unit with the transceiver as a unitary member; and a supporting section provided within a compartment of the vehicle and formed with a fitting recess, wherein the case is designed to have the same external form and size as those of an audio equipment which can be fitted in the fitting recess of the supporting section.

In this case, the supporting section inside the vehicle may be used as a center console, while the fitting recess may be also designed to have the required standard size determined as an external form of the audio equipment. Further, if the external form of the case has the required standard size determined as the external form of the audio equipment, the case can be also fitted into the fitting recess which has the required standard size determined as the external form of the audio equipment.

As described above, when the case of the vehicular radiotelephone is designed to have the same external form and size as those of the audio equipment and it is fitted into the fitting recess for the audio equipment formed on the supporting section inside the vehicle, the vehicular radiotelephone equipment can be fitted in the compartment of the vehicle in one united body. Furthermore, as the vehicular radiotelephone equipment unites the function necessary to the transceiver with the telephone function unit aggregating all function necessary to the radio communication, wiring is only required between the vehicular radiotelephone equipment, a power source and an antenna or the like. Hence, there is no more necessity to have a long distribution cable to connect the telephone to the transceiver and to fix the radiotelephone at plural points as seen in the prior art. As a result, the fitting operation for the radiotelephone is easier.

In addition, if the fitting recess is formed on the center console, the operability can be improved. Further, if the case and the fitting recess are respectively designed to have the same required standard size as that of the audio equipment, the vehicular radiotelephone equipment can be fitted in together with the various audio equipment as a unitary member.

Still further, it is also possible to detachably mount the transceiver to the case so that it can be used in common as the detachable transceiver section constituting a portable radiotelephone separate from the vehicular radiotelephone. In this case, if the transceiver is removed from the telephone function unit of the radiotelephone equipment and put on the separately provided small-sized transmitter-receiver, it can be used as an ordinary portable radiotelephone inside or outside the vehicle and it is economical because the components can be used in common. In case that this portable radiotelephone is used inside the vehicle, it is very convenient because a personal call can be made without disturbing co-passengers so much and it can be further placed for use in the rear seat.

The above and other objects, features and advantages of the invention will become more apparent from the following description when taken in conjunction with the accompanying drawings, in which:

DESCRIPTION OF THE PREFERRED EMBODIMENT

Figure 1:
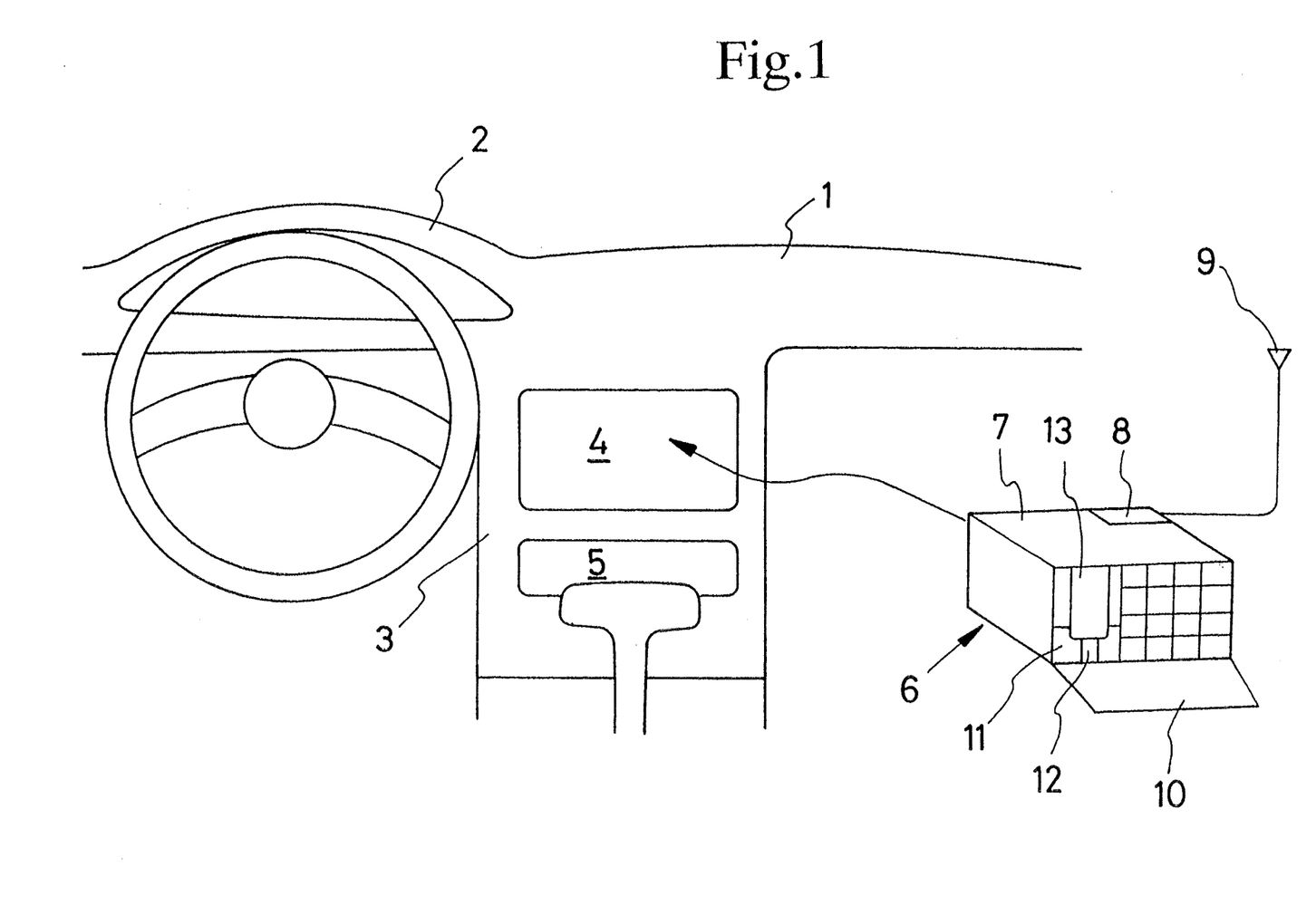
FIG. 1 is a schematic illustration showing a center console and a vehicular radiotelephone equipment mounted thereon according to a first embodiment of the present invention.
Figure 2:
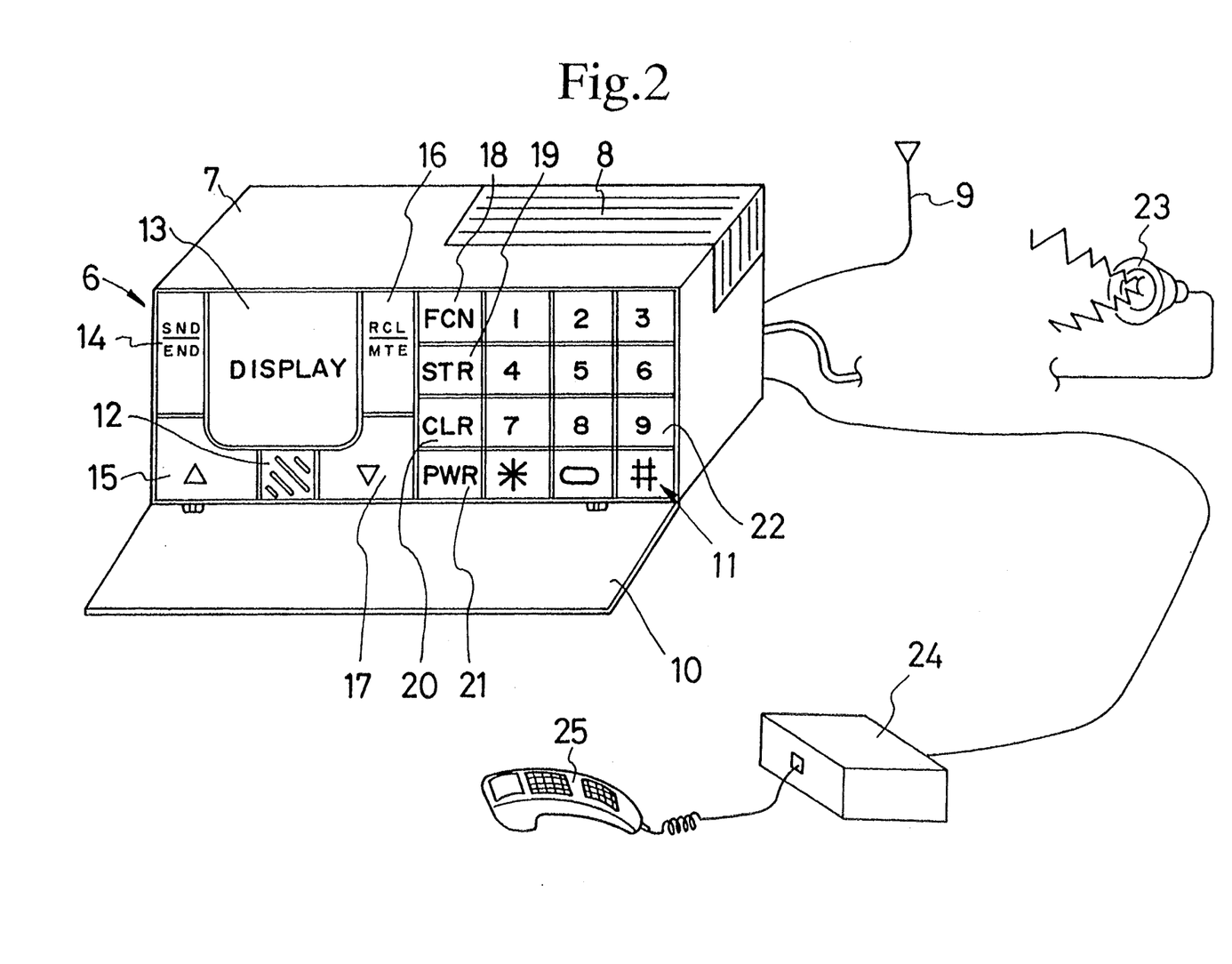
FIG. 2 is an enlarged perspective view illustrating a connection system of the vehicular radiotelephone equipment with the other parts according to the first embodiment.

FIGS. 1 and 2 show a first embodiment of the present invention. FIG. 1 is a schematic illustration showing a way of installing the vehicular radiotelephone equipment according to the present embodiment to the center console of the vehicle. In this figure, an instrument panel 1 is provided at a driver's seat side with a meter panel 2 and at its center part with a center console 3 which is integrally formed therewith and extends toward a vehicle floor. The instrument panel 1 and the center console 3 are one example of a supporting section within a compartment of the vehicle.

The center console 3 is formed with a fitting recess 4 of the required standard size based on the required standard such as Deutsche Industrie-Norm (DIN) determined on the external form of an audio equipment device. There is further provided below the above-mentioned fitting recess an additional fitting recess 5 having a half size thereof.

The fitting recess 4 is designed to accommodate the vehicular radiotelephone equipment 6 usable as a vehicle built-in unit. The external form of the vehicular radiotelephone equipment 6 is composed of a case 7 which has almost the required standard size and after its fitting in the recess 4, the equipment is fixed through a suitable bracket (not shown here) to the center console 3 at the backside thereof.

The vehicular radiotelephone equipment 6 is a hands-free type in which a telephone function unit and a detachably mounted transceiver 8 are incorporated in the case 7 as a unitary member and all the components necessary to the telephone are aggregated in the telephone function unit as will be described later. An antenna 9 is connected to the detachable transceiver 8.

FIG. 2 is an enlarged perspective view illustrating the details of the vehicular radiotelephone equipment 6 together with its connection system to the other components. First, the configuration of the telephone function unit will be described below. It is composed of all the components necessary to fulfill the telephone function including a transmitter-receiver section, an operating section and a communication control section.

The case 7 is provided at its front surface with a face cover 10 for opening and closing purpose. There is provided an operation panel 11 at a portion covered by the face cover 10. The operation panel 11 is further provided with various function keys such as a hands-free microphone 12 and a display 13 or the like.

The function keys include a sending/ending key 14, a volume increase key 15, a recall/mute key 16, a volume decrease key 17, a function key 18, a memory store key 19, a memory clear key 20, a power source key 21 and ten keys 22. The case 7 further includes at its inside all other components necessary for the telephone such as a communication control section (not shown in the drawing).

The transceiver 8 is a miniaturized radio transmitter-receiver which can be detachably mounted to the rear portion of the case 7 and once installed, it presents an appearance integrally formed with the case 7. The antenna 9 connected to the transceiver 8 is used in common for a car radio and the feeder of the vehicle-installed antenna for the radio is then connected to an antenna terminal of the vehicular radiotelephone equipment 6.

A receiving audio output section of the vehicular radiotelephone equipment 6 is connected to a vehicle-installed audio speaker 23 and when a telephone call is made by a hands-free mode without holding the handset by hand, it is possible to output a loud voice by having the transmitting audio from a called party interrupted to an audio output.

The vehicular radiotelephone equipment 6 can be further connected through a converter 24 to the handset 25. When it is required to use the handset 25, conversation can be carried by using the same transmitter-receiver of the handset 25 as the ordinary telephone in place of conversation by the hands-free operation.

Next, the operation of the present embodiment will be described. Referring first to FIG. 1, when the vehicular radiotelephone equipment 6 is inserted into the fitting recess 4, it can be well fitted therein because the case 7 is designed to have the same required standard size as the fitting recess 4. With this well-fitting design, it is possible to enhance the unity of the center console 3 with the instrument panel 1.

Under this condition, where the face cover 10 of the vehicular radiotelephone equipment 6 is opened for a passenger to operate the function key on the operation panel 11, it is to be noted that the key operation is easy because the vehicular radiotelephone equipment 6 is mounted on the center console 3 and it is easily accessible by the passenger.

When a hands-free telephone operation is required, the sending/ending key 14 is pushed first and then selected one of the ten keys 22 or the like are selectively operated to call a party. It becomes possible to start a conversation when the telephone of the called party responded to the call and then the transmitting audio signal is inputted through a hands-free microphone 12 to the inside of the vehicular radiotelephone equipment 6 and after the required processing therein, it is transmitted from the transceiver 8 and the antenna connected thereto to the telephone of the other party, while the receiving audio signal transmitted from the other party is first received by the transceiver 8 and after the required processing inside the vehicular radiotelephone equipment 6, it is interrupted to the audio output and then outputted in a loud-speech mode from the vehicle-installed speaker 23.

Furthermore, if the converter 24 is switched, a hands-free mode will be changed to the telephone conversation via the handset 25. In this case, the interrupt of the receiving audio signal to the audio output is disabled, unlike the state of the hands-free telephone conversation.

According to the present invention, as the antenna 9 is used in common for the vehicle-installed radio antenna, there is no necessity to distribute an additional antenna cable for exclusive use of the vehicular radiotelephone equipment 6. It is to be further noted that the antenna 9 does not contract for each of the hands-free operation via the vehicular radiotelephone equipment 6 during use of the car radio.

Figure 3:
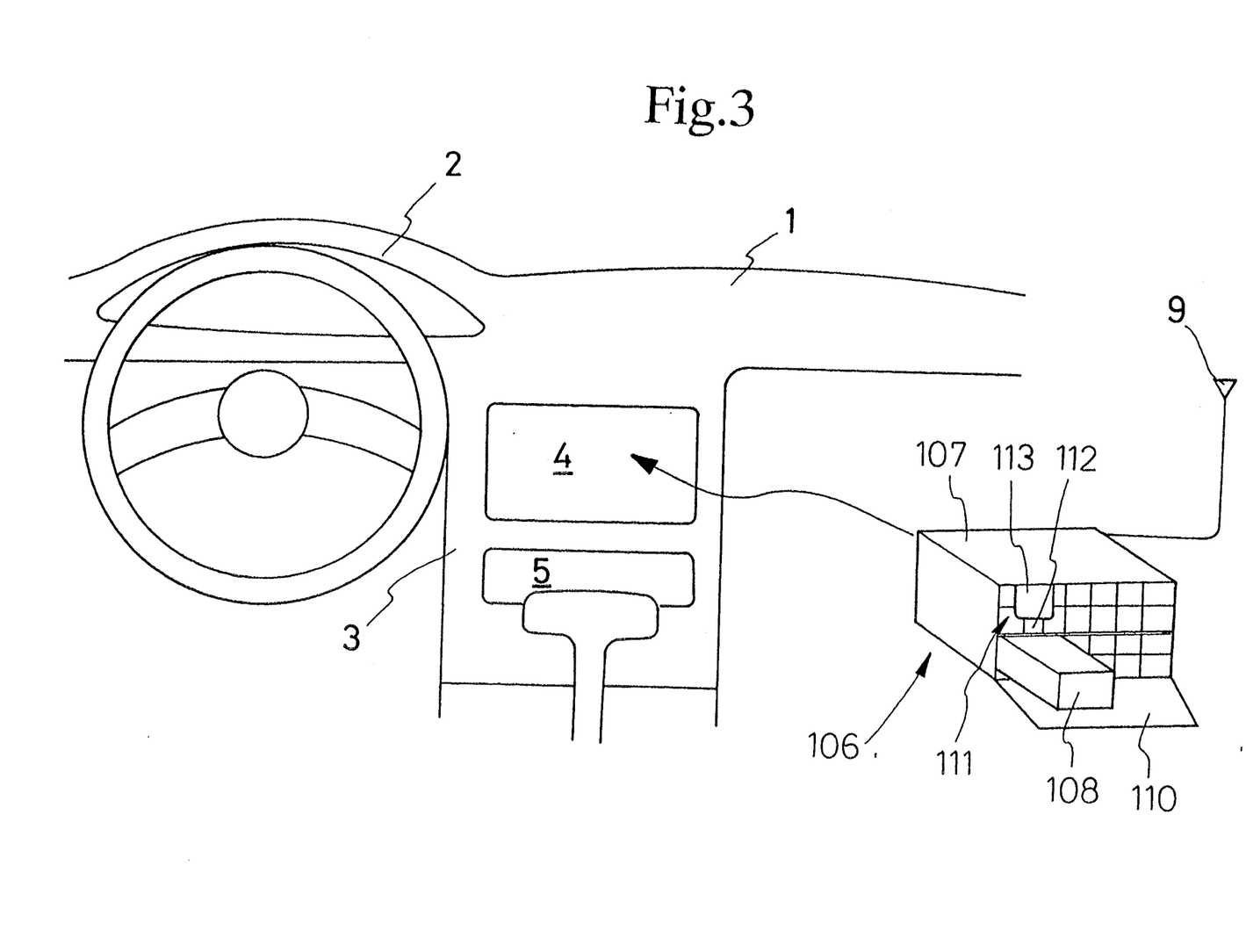
FIG. 3 is a schematic illustration corresponding to FIG. 1 according to a second embodiment of the present invention.
Figure 4:
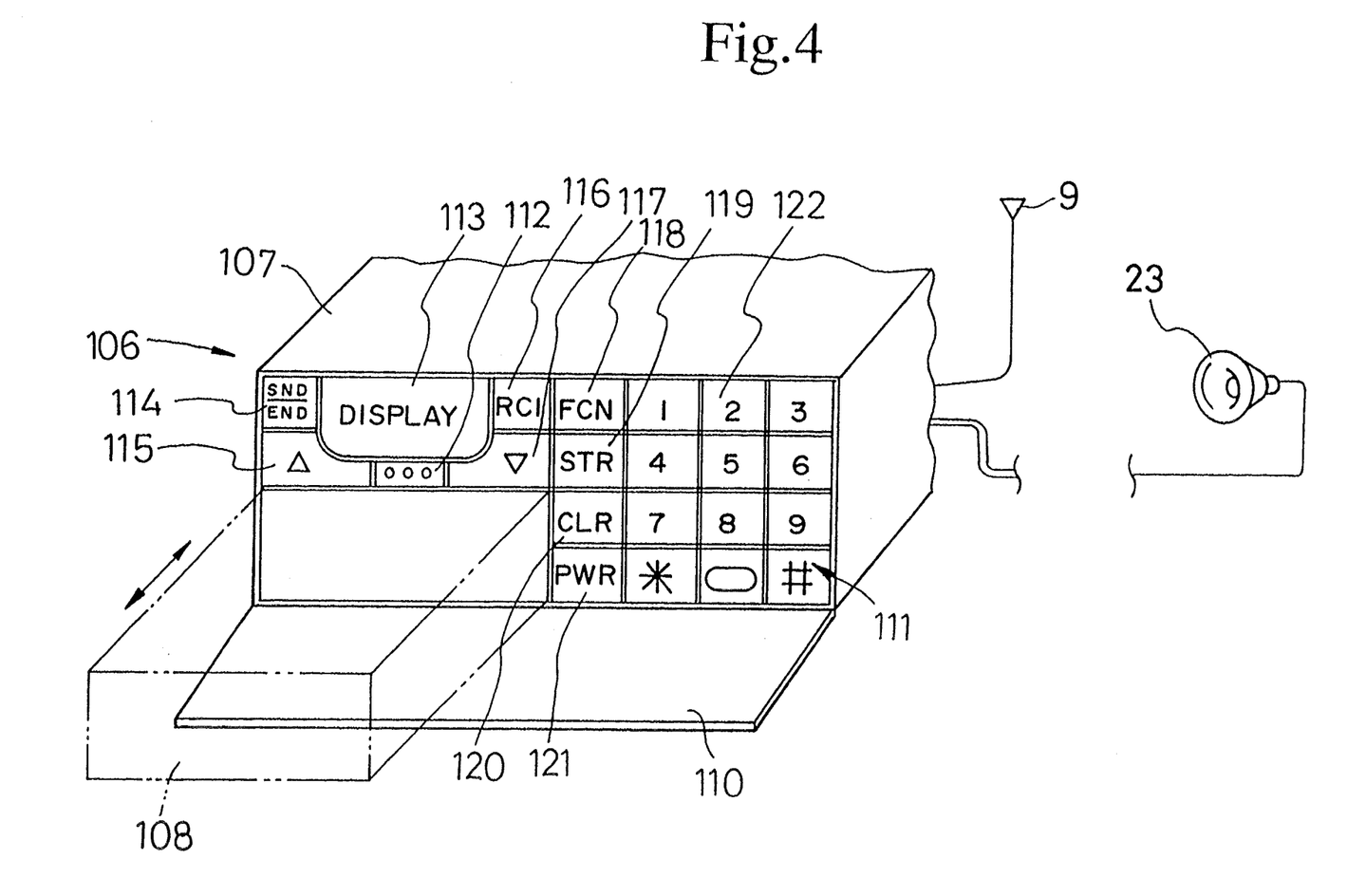
FIG. 4 is an enlarged perspective view illustrating the details of the vehicular radiotelephone equipment according to the second embodiment.
Figure 5:
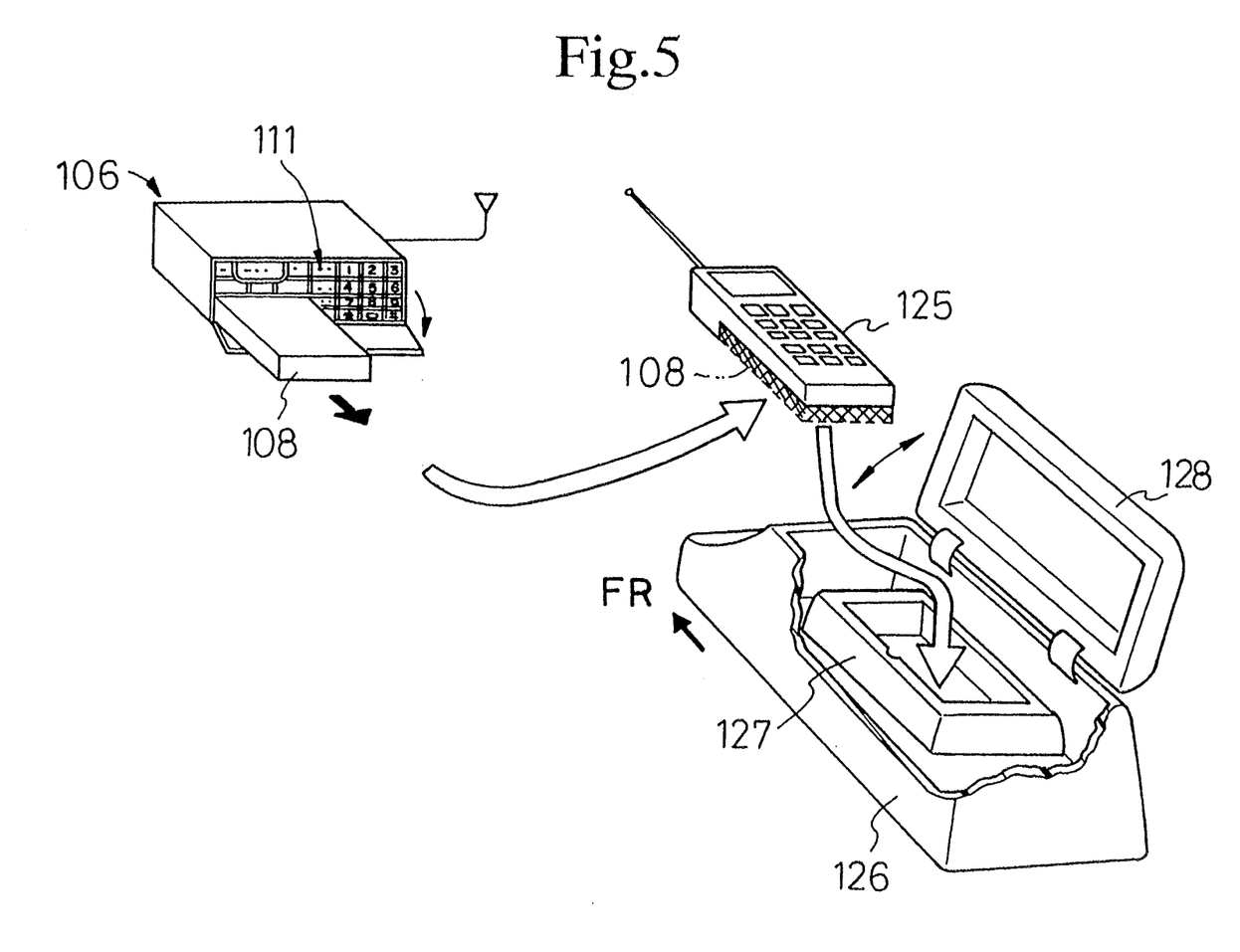
FIG. 5 is a system concept view illustrating a two-way use between the vehicular radiotelephone equipment and a portable radiotelephone according to the second embodiment.

Referring now to FIGS. 3 through 5, there is shown a second embodiment. In this embodiment, it is characterized wherein the transceiver in the first embodiment is now detachably mounted on the front part of the case, and the other fundamental structure and the body installation structure remain unchanged. Like reference numerals designate like or corresponding parts for all embodiments described hereunder.

FIG. 3 is a schematic illustration showing a state of mounting the vehicular radiotelephone equipment according to the present invention on the center console.

The vehicular radiotelephone equipment 106 is made up of the case 107, the telephone function unit and the transceiver 108, wherein the telephone function unit and the transceiver 108 are designed to be held together by the case 107 as a unitary member. The transceiver 108 is miniaturized and detachably mounted to the opening provided at the front part of the case 107. For example, when the transceiver 108 is fitted into the telephone function unit through the opening, it is connected to the latter therein and unified and as a result, the vehicular radiotelephone equipment 106 functions now as a hands-free type radiotelephone equipment.

Incidentally, the transceiver 108 includes a built in battery (not shown in the drawing) adapted to serve as a power source for a portable radiotelephone which will be described later, and the battery is, when the transceiver 108 is unified by its fitting into the case 107, charged with electricity from a vehicle-equipped power source in the non-use condition of the telephone after an engine is started.

FIG. 4 is an enlarged perspective view illustrating the detailed appearance of a vehicular radiotelephone equipment 106 and the connection system thereof with the other parts. A case 107 is provided at its front part with a face cover 110 for opening and closing purpose and an operation panel 111 is formed at the portion covered by the face cover 110. The operation panel 111 is provided with a hands-free microphone 112, a display 113 and the other various function keys.

This function key includes a sending/ending key 114, a volume increase key 115, a recall/mute key 116, a volume decrease key 117, a function key 118, a memory store key 119, a memory clear key 120, a power key 121, and ten keys 122 or the like. The rest remains unchanged (see the first embodiment).

FIG. 5 is a system concept view in which a transceiver 108 is either used as the vehicular radiotelephone equipment 106 or a portable radiotelephone and there is provided a small-sized transmitter-receiver 125 in addition to the vehicular radiotelephone equipment 106. This small-sized transmitter-receiver 125 corresponds to the well-known portable radiotelephone from which only the transceiver portion was removed.

The transceiver 108 is used in common for the transceiver portion of the portable radiotelephone. Namely, this means that the transceiver 108 is detachably mounted on the small-sized transmitter-receiver 125, too. When the transceiver 108 is fitted in the small-sized transmitter-receiver 125, it forms the portable radiotelephone and is charged with electricity from the transceiver 108 built-in battery and therefore it is possible to use it independently as an ordinary portable radiotelephone.

The small-sized transmitter-receiver 125 is, when not used, kept in place inside the vehicle, e.g. kept inside the center armrest 1.26 provided in the center of the rear seat. The armrest 126 is provided at its inside with a space in which a receptacle 127 for the small-sized transmitter-receiver 125 is arranged. Accordingly, the small-sized transmitter-receiver 125 is, when not used, rested on the receptacle 127 inside the center armrest 126 and closed by a cover 128 for burglarproof purpose. Furthermore, a suitable place such as a center console is also available in place of the center armrest 126.

Next, the operation of the present embodiment will be described. Referring first to FIG. 3, in case that it is used as the vehicular radiotelephone equipment, the transceiver 108 is to be fitted in the telephone function unit in advance for unification so that the vehicular radiotelephone equipment 106 can be provided. Under this condition, when the hands-free conversation is required, the way of operation is the same as that of the first embodiment and will not be further described herein.

In addition, in case of the portable radiotelephone, the transceiver 108 is taken Out of the vehicular radiotelephone equipment 106 as shown in FIG. 5 and it is then fitted in the small-sized transmitter-receiver 125 which was removed from the receptacle 127 held in the center armrest 126. With this operation, as the small-sized transmitter-receiver 125 can be used as an ordinary portable radiotelephone for radio conversation, it is economical. Especially, when the transmitter-receiver is used within the compartment of the vehicle, it is convenient because an individual can have a personal conversation unlike the hands-free conversation via the vehicular radiotelephone equipment 106 and without disturbing the co-passengers so much and it is further available for co-passengers in the rear seat.

Figure 6:
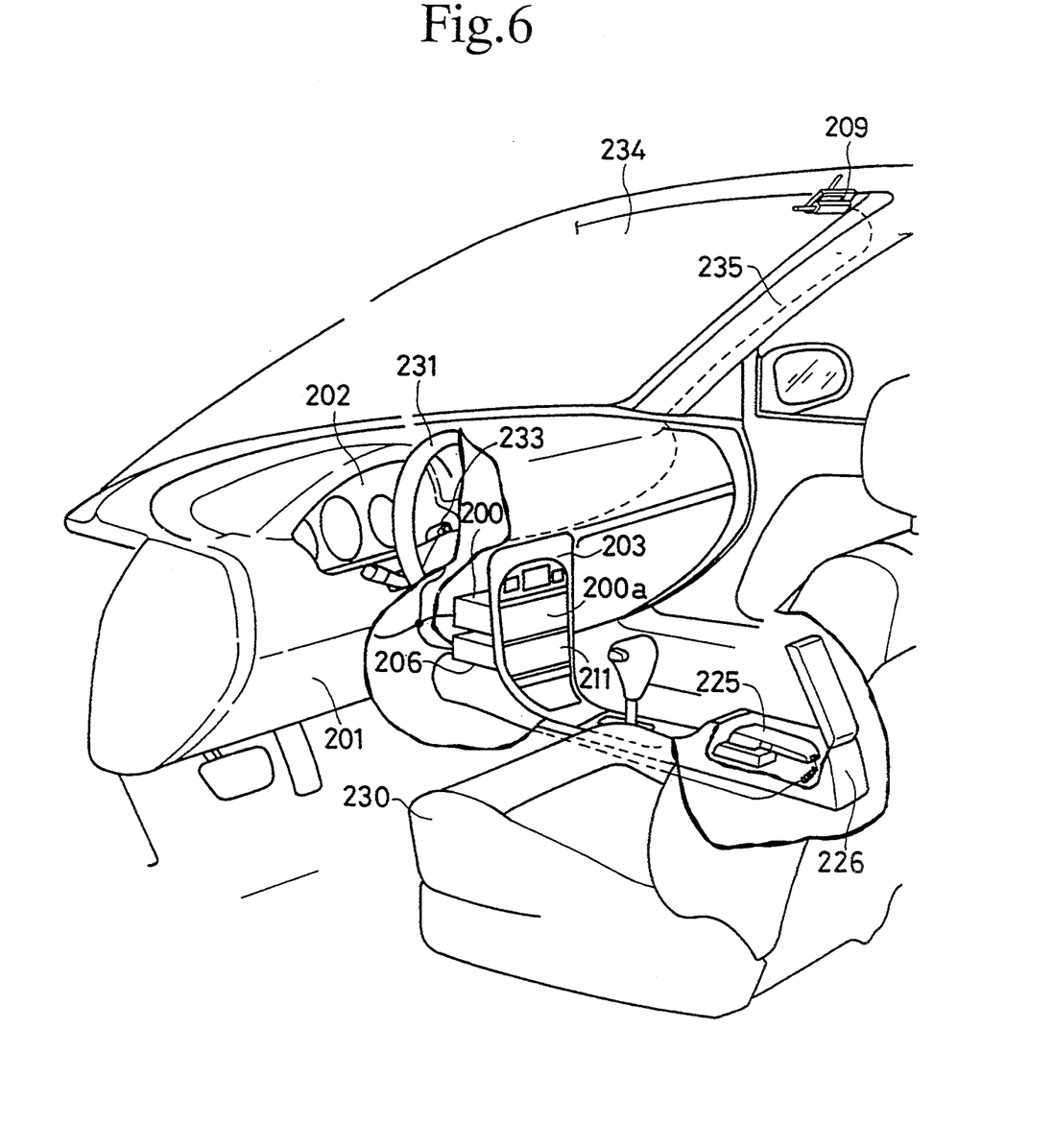
FIG. 6 is a partially cutaway view illustrating the mounting of the vehicular radiotelephone equipment on the center console within a front compartment of the vehicle according to a third embodiment.

FIG. 6 is a partially cutaway view illustrating the front part of the compartment of the vehicle according to the third embodiment in which audio equipment 200 and the vehicular radiotelephone equipment are arranged in parallel on the center console 203. Although not clear in this drawing, the center console 203 is preset with two fitting recesses 204a and 204b (see FIG. 8), both here in the same size and in parallel as shown in FIG. 1 which are designed to have the required standard size determined on the external form of the audio equipment 200.

The vehicular radiotelephone equipment 206 shown here is the same type as the radiotelephone equipment 6 of the first embodiment or 106 of the second embodiment, but it may not always have a built-in microphone. An optional handset 225 to be connected to the vehicular radiotelephone equipment 206 can be contained within the center armrest 226 which is provided at the side of a front scat 230.

Figure 7:
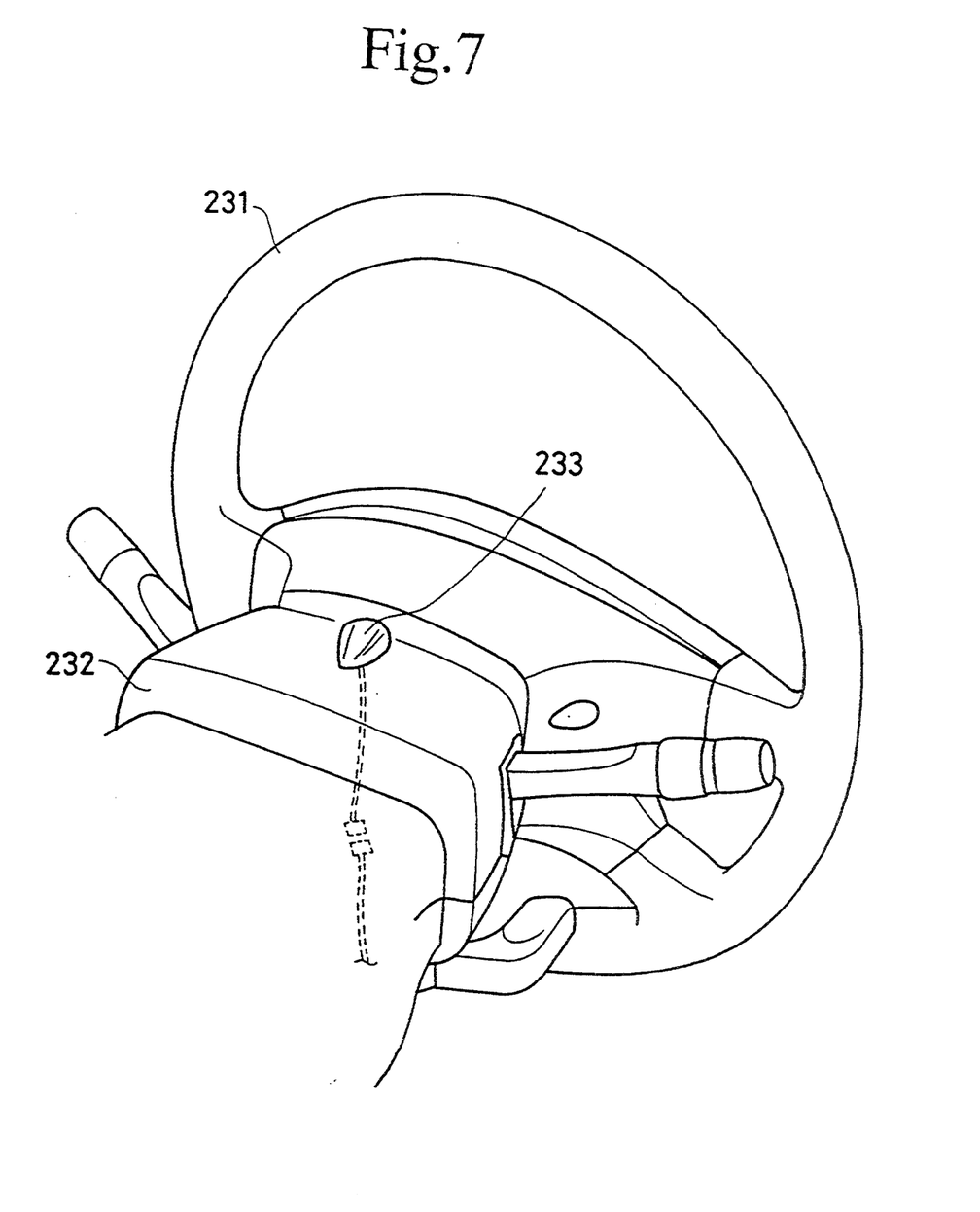
FIG. 7 is a schematic illustration showing an installation part of a steering wheel, as viewed from a different angle, according to the third embodiment.

As obvious from FIG. 7 illustrating an installation part of a steering wheel 231 as viewed from the side of a meter panel 202, there is provided a separate microphone 233 as an option on a column cover 232 which is an immovable member fixed on the vehicle body and adapted to cover the installation part of the steering wheel 231.

Furthermore, there is provided an antenna 209 used in common for the audio equipment in the vicinity of the ceiling of a windshield 234. A cable distribution between the antenna 209, the handset 225 and the optional microphone 233 or the like is made through a pillar garnish 235, the center console 203 and then the instrument panel 201.

Figure 8:
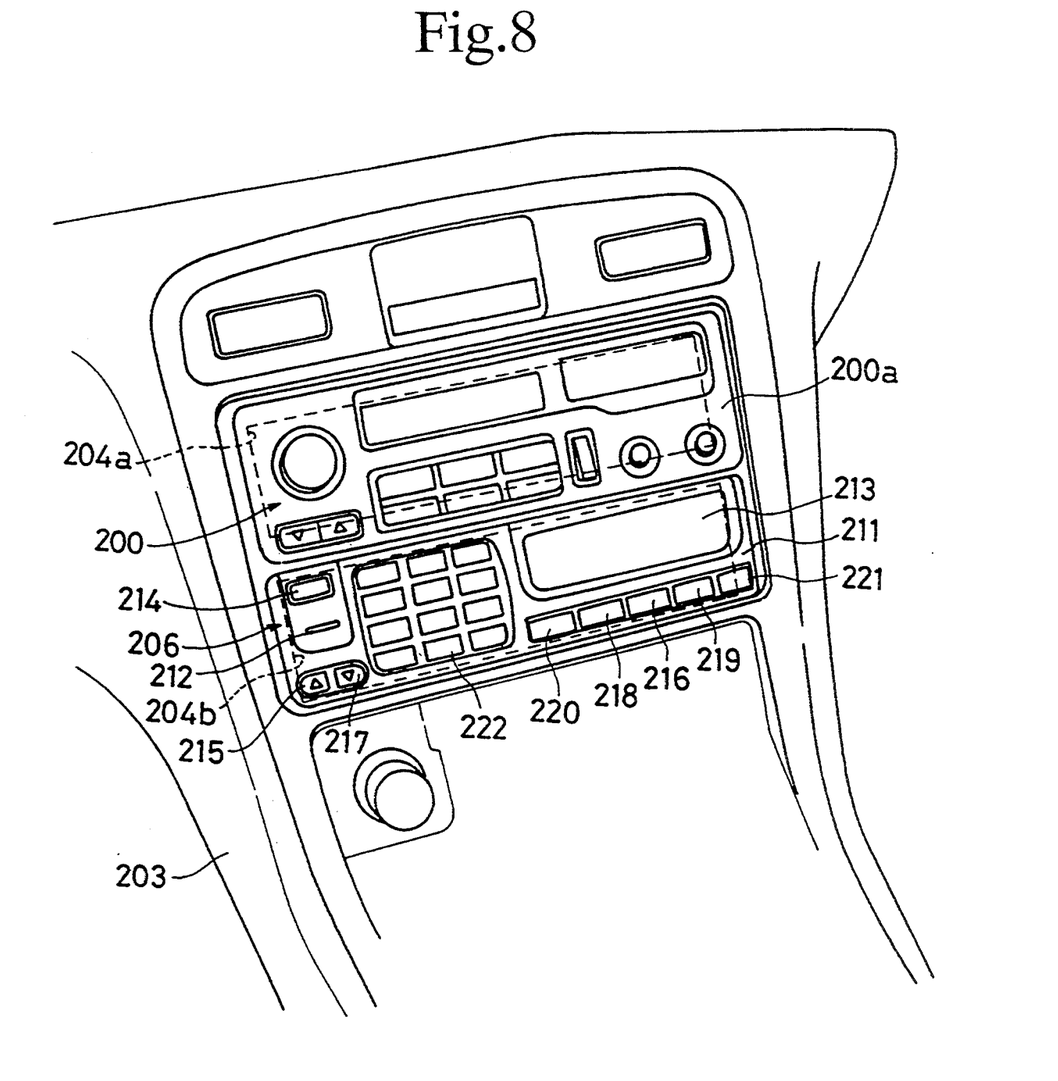
FIG. 8 is an enlarged perspective view illustrating the mounting condition of the vehicular radiotelephone equipment and an audio equipment according to the third embodiment.

FIG. 8 is an enlarged perspective view illustrating the mounting condition of the audio equipment 200 and the vehicular radiotelephone equipment 206 on the front part of the center console 203. In this drawing, each main body of the audio equipment 200 and the vehicular radiotelephone equipment 206 is fitted in each of the fitting recesses 204a and 204b, while each area of operation panels 200a and 211 is designed to be larger than each frontage of the fitting recesses 204a and 204b.

There are provided on the operation panel 211 a hands-free microphone 212, a display 213, a sending-/ending key 214, a volume increase key 215, a volume decrease key 217, a recall/mute key 216, a function key 218, a memory store key 219, a memory clear key 220, a power key 221, ten keys 222 or the like, in the same manner as the previous embodiments.

Further, the speaker for the audio equipment in the vehicle is used in common for the vehicular radiotelephone equipment 206 and when the radiotelephone equipment 206 is used, the output voice at the side of the audio equipment is adapted to be muted.

Still further, when each of the ten keys 222 is pre-registered to have a specified telephone number, there is provided with a function which can make it possible to transmit the signal by simply pushing any one of such ten keys 222.

With this configuration, as the audio equipment 200 and the vehicular radiotelephone equipment 206, both having the same external form and size, can be fitted in position in parallel, it is possible to incorporate them as a unitary member.

In addition, if the fitting recesses 204a, 204b or the like for a plurality of audio components can be prearranged on the front part of the center console 203, it will be more convenient as one of such recesses may be used at any time for fitting the vehicular radiotelephone equipment 206 therein.

What is claimed is:

1. Radiotelephone equipment for use in a vehicle comprising:
   a telephone function unit including a transmitter-receiver section, an operating section and a communication control section;
   a transceiver connected to the telephone function unit;
   a hands-free microphone operatively connected to said transceiver for inputting audio signals from a user;
   a vehicle installed speaker operatively connected to said radiotelephone equipment for broadcasting audio signals from another party;
   a separate handset operatively connected to said radiotelephone equipment for permitting use of said radiotelephone equipment without utilizing the hands-free microphone and vehicle installed speaker;
   a case used in common for incorporating the telephone function unit with the transceiver as a unitary member; and
   a supporting section provided within a compartment of the vehicle and formed with a fitting recess;
   wherein the case is designed to have the same external form and size as audio equipment and is to be fitted in the fitting recess of the supporting section;
   wherein the transceiver is detachably mounted relative to the case and is adapted to be mounted with a portable radiotelephone separately provided from the vehicular radiotelephone equipment.

* * * * *